Dec. 8, 1925.

O. G. AHRENS 1,564,187

DIRT TANK CLEANER

Filed Sept. 20, 1922

INVENTOR
Otto G. Ahrens
BY Adam E. Fisher
ATTORNEY

Patented Dec. 8, 1925.

1,564,187

UNITED STATES PATENT OFFICE.

OTTO G. AHRENS, OF KARNES, TEXAS.

DIRT-TANK CLEANER.

Application filed September 20, 1922. Serial No. 589,382.

*To all whom it may concern:*

Be it known that I, OTTO G. AHRENS, a citizen of the United States, residing in the city of Karnes and State of Texas, have invented new and useful Improvements in Dirt-Tank Cleaners, of which the following is a specification, reference being had to the accompanying drawings.

This invention is in the way of a dirt tank cleaner, or dirt remover, and the object is to provide a simple and practical machine for removing dirt from the bottom of tanks containing water, or for transferring mud from one side of a dam to the other side, or for digging irrigation ditches through fields, and for similar purposes.

In the drawing—

Figure 1:
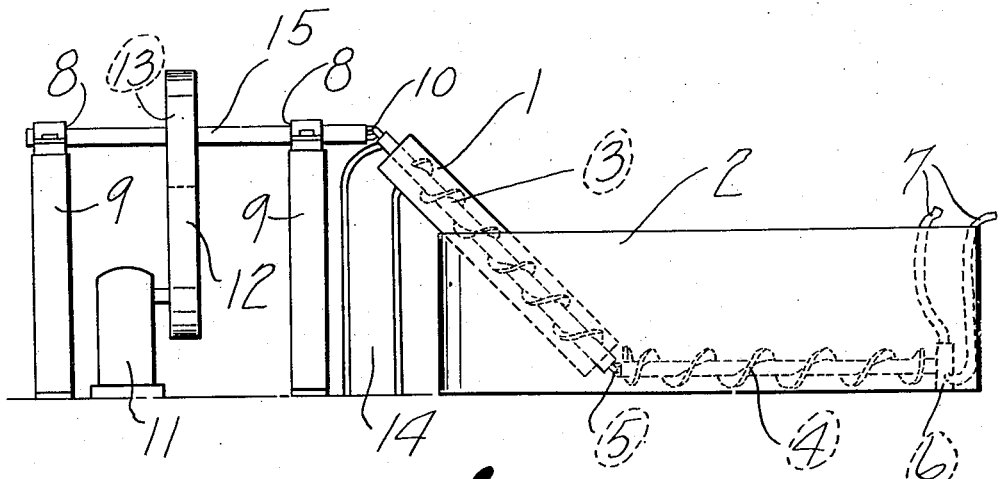
Figure 1 is a side elevation of the device mounted for use in removing dirt from a tank of water.
Figure 2:
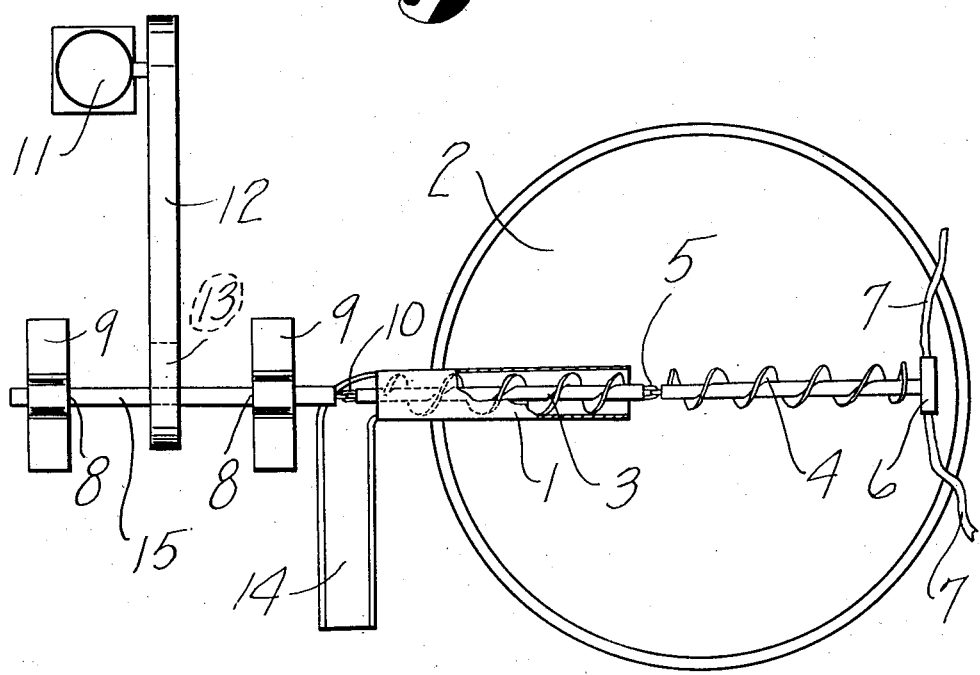
Figure 2 is a top or plan view, a section of the pipe being removed to show the worm within.

The invention consists in providing a pipe 1 of suitable length to reach at an angle from the top to the bottom of the tank 2. A worm 3 is then extended through this pipe and adapted to turn freely therein. Another worm 4 is connected by a universal joint 5 to the end of the worm 3, and the worm 4 is then extended out across the bottom of the tank 2 and remains uninclosed. The extreme end of the worm 4 is turned down and journaled in a supporting leg 6 to which wires 7 are attached and extended oppositely outside the tank. A drive shaft 15 is journaled at 8 in supporting legs 9 which stand outside the tank 2, and the outer end of the worm 3 is connected to this shaft by a universal joint 10. The shaft 15 is driven by an engine 11 and belt 12 passing over the pulley 13 on the shaft. A metal chute 14 is provided to receive the mud and direct it as desired.

In use the worm 4 may be pulled from side to side at the bottom of the tank 2 and this worm 4 draws the mud into the pipe 1 where the worm 3 catches it, and forces it up and out of the tank.

While I have herein described a certain specific method of constructing and assembling the elements of my invention, it is understood same may be varied in minor details, not departing from the spirit of my invention as defined in the appended claim.

I claim:

A device for removing dirt from tanks, comprising a pipe extended down into the tank; a worm in the pipe; a second worm universally connected to the pipe worm and disposed at the bottom of the tank; a bearing for the free end of the said second worm; wires attached to said bearing and extended outside the tank; and means for rotating the said pipe worm.

OTTO G. AHRENS.